United States Patent [19]
Shelley

[11] 3,757,190
[45] Sept. 4, 1973

[54] SLIP RING ELECTRICAL CONNECTIONS

[75] Inventor: Meville Leslie Shelley, Lindfield, England

[73] Assignee: Redifon Limited, London, England

[22] Filed: Feb. 18, 1972

[21] Appl. No.: 227,556

[52] U.S. Cl..................... 318/625, 318/491, 318/43
[51] Int. Cl. .......................................... G05b 11/32
[58] Field of Search..................... 318/43, 491, 625, 318/15; 310/154, 46

[56] References Cited
UNITED STATES PATENTS
2,739,278   3/1956   Blankenship.................... 318/491 X
3,427,519   2/1969   Louis.............................. 318/625 X
3,575,647   4/1971   Levy............................... 318/625 X Primary Examiner—B. Dobeck
Attorney—Roberts B. Larson et al.

[57] ABSTRACT

A slip-ring servo arrangement for overcoming the friction of electrical slip-ring and brush rotating connections. In such an arrangement with fixed brushes and rotatable slip rings providing electrical connections to a servo motor driven rotor, the slip rings are separately mounted and separately servo motor driven, according to the same demand signal as the rotor, and the slip ring-to-rotor electrical connections are flexible to permit of limited rotational displacement between the rotor and the slip rings.

6 Claims, 2 Drawing Figures

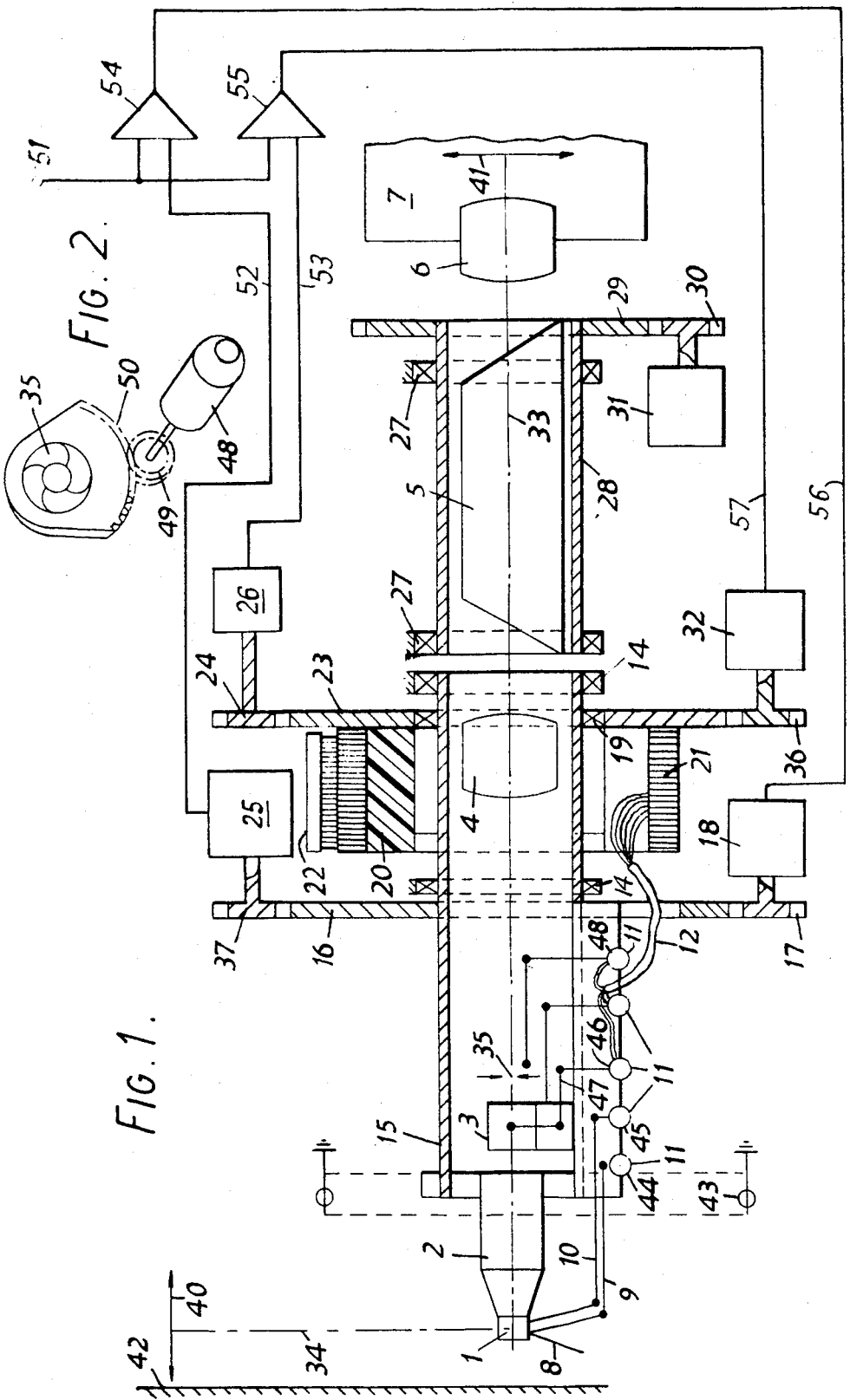

SLIP RING ELECTRICAL CONNECTIONS

This invention relates to slip ring electrical connections and to devices comprising a rotatable part provided with slip ring electrical connections thereto.

The invention has a particular application to optical systems having a part or parts which are rotatable about an optical axis and to which rotatable part electrical connections are made by slip rings, for the purpose of supplying electrical power to elements of the rotatable part, or deriving electrical signals therefrom, or both. Although the invention has a wider application than to such optical systems solely, it will be most clear to describe the invention as applied to such a system.

One such system has a camera with a camera lens which defines the optical axis of the system and has a plurality of optical elements which are separately rotatable about the said optical axis. At least a first of the optical elements is rotated by a servo motor which is stationary relative to the optical axis. However, the significant feature of this system is that at least one other of the rotatable elements is driven by a servo motor carried by said first rotatable element. This feature requires the provision of a slip ring assembly on the said first element for the supply of electrical power to the servo motors carried thereby.

The first rotatable element is required to rotate smoothly and to be positioned accurately relatively to the optical axis and it has been found that the friction of the slip ring assembly impairs the performance in these respects.

The object of the present invention is to provide an improved slip ring arrangement in which the effect of slip ring and brush friction upon rotational performance is greatly reduced.

Thus, the invention relates to a device comprising a first rotatable part having slip ring and brush electrical connections thereto from a stationary part, the slip rings being coaxial with the first rotatable part and the slip rings or the associated brushes being mounted on a second rotatable part, the first rotatable part being connected to the slip rings or the associated brushes mounted on the second rotatable part by flexible electrical connections, thereby permitting relative rotational displacement of said first and second rotatable parts through a limited angle, the first and second rotatable parts being driven by separate first and second motor means, respectively.

In such a device, one solution of the slip ring and brush friction problem is to drive the second rotatable part substantially synchronously with the first rotatable part by the second motor means which is controlled by a sensing device for sensing the relative rotational displacement between the first and second rotational parts.

Such a sensing device would require two inputs, one supplied from each of the first and second rotational parts and a single output indicating the rotational displacement between the first and second rotational parts. A suitable mechanical sensing device would be a differential gear.

However, it is preferred, according to the present invention, to drive the first and second rotatable parts by separate first and second servo motor means, respectively, both servo motors being driven by a common angular demand signal, the first and second rotatable parts driving first and second angular position measuring devices, respectively, the first and second servo motors being driven to minimise the rotational error between the common angular demand signal and the measured angular position of the first and second rotatable parts, respectively.

In such an arrangement having stationary brushes, the slip rings are conveniently assembled into a unitary structure, which may be cylindrical, conical or disc-shaped, so that all the slip rings are mounted together and rotated together with the second rotatable part.

The means for minimising the rotational error of the first and second rotatable parts relatively to the common angular demand signal are, conveniently, first and second servo amplifiers controlling the first and second servo motors, respectively, and fed both with the common angular demand signal and each with an angular position signal derived from the first and second angular position measuring devices, respectively.

In order that the invention may be fully understood and readily carried into practice, one embodiment will now be described in detail, by way of example, with reference to the accompanying drawings, in which:

FIG. 1 is a diagrammatic longitudinal sectional view taken on the optical axis of an optical system to which the present invention is applied; and FIG. 2 is a diagrammatic perspective view of the iris assembly and motor control thereof forming a part of the optical system of FIG. 1.

The optical system of FIG. 1 comprises a number of optical elements, later described in detail, for forming an image of an object 40 upon the screen 41 of a television camera 7. All of the optical elements have the common optical axis, represented by the chain line 33–34 and it will be noted that the optical axis 33 is turned at right angles at 34, in the view of FIG. 1, by a pitch prism 1. The pitch prism 1 is rotatable about an axis perpendicular to the plane of the view of FIG. 1, whereby the angle between the optical axis parts 33 and 34 may be varied to be greater or less than 90°.

The object 40 is mounted on a plane surface 42. The relative distance of the pitch prism 1 above the plane surface 42 may be varied either by moving the surface 42 or by moving the optical system including camera 7 of FIG. 1. The pitch prism permits of the optical axis part 34 being inclined at an angle above or below a plane parallel to plane 42. A height probe 8 indicates electrically when the distance between the pitch prism 1 and the surface 42 is reduced to a permitted minimum distance.

An objective lens 2 views the object 40 through the pitch prism 1 and forms a first image thereof in a plane between the lens 2 and a tilt lens 3. The plane of this first image may not be perpendicular to the optical axis 33. Tilt lens 3 is provided to correct this error by a second image viewed by a lens 4 through an adjustable iris 35. The lens 4 forms a third image at infinity, which image is viewed by camera lens 6 to form a real image on the screen 41 of television camera 7.

Rotation of this image of object 40, upon screen 41 and relatively to optical axis 33 and 34, is produced by rotation of a roll prism 5, the optical axis of which coincides with axis 33. The prism 5, in this example a Dove prism, is mounted in a tube 28 and rotated on anti-friction bearings 27 by a gear wheel 29 fixed to the tube 28 and driven by a roll servo motor 31 through a pinion 30.

Pitch prism 1, objective lens 2 and tilt lens 3 are all mounted on a first rotatable part comprising a tube 15. Rotation of tube 15 produces rotation of these elements and rotation of the optical axis part 34 about the optical axis part 33, to provide azimuth change in viewpoint. The tube 15 is mounted on anti-friction bearings 14 and carries a gear wheel 16 by which the tube 15 is rotated axially by azimuth servo motor 18 driving gear wheel 16 through pinion 17.

In the optical system of FIG. 1, a number of servomotors and electro-mechanical sensors are mounted on the tube 15 and are rotated with it. In FIG. 1, these are represented generally at 11.

More particularly, the height probe 8 is connected by a mechanical linkage to a sensor 44. The pitch prism 1 is rotated about the axis perpendicular to axis 33 and 34 by a servo motor 45 through a mechanical linkage 10. The tilt lens is tilted about its axis perpendicular to axis 33 and displaced axially by a servo motor 46 through a mechanical linkage 47. As shown more clearly in FIG. 2, the ring of iris 35 is formed by a toothed quadrant 50, which is rotated by a servo motor 48 through a pinion 49.

All of the servo motors and sensors 11 have electrical connections which are brought out to static equipment, not shown, separate from the optical system of FIG. 1 and, to enable these connections to be made while the assembly is free to rotate about the axis 33, a slip ring assembly 21 is provided having stationary associated brush connections 22.

In order to avoid degradation of the rotational accuracy of tube 15 and to remove the frictional drag between the slip ring assembly 21 and the brush assembly 22 from the azimuth servo motor 18, the slip ring assembly 21 is separately mounted upon a second rotatable part including a cylindrical insulator 20 and separately driven by an azimuth guard servo motor 32.

Thus, anti-friction bearings 19 are mounted on tube 15 and carry the cylindrical insulator 20 upon which is mounted the slip ring assembly 21. Attached to the insulator 20 is a gear wheel 23 and this is driven by the servo-motor 32 through a pinion 36. Limited rotational displacement between the slip ring assembly 21 and the tube 15 assembly is permitted and, to this end, the electrical connections from the sensors and servo-motors 11 to the corresponding slip rings of the assembly 21 are made by flexible electrical connections represented at 12.

The gear wheel 16 of the first rotatable part which includes the tube 15 drives a pinion 37 which drives a first angular position measuring device, or potentiometer, 25. The gear wheel 23 of the second rotatable part which includes the insulator 20 drives a pinion 24 which similarly drives a second angular position measuring device, or potentiometer, 26. The output angular position signals of the potentiometers 25 and 26 appear on lines 52 and 53, respectively.

An angular demand signal, derived from an associated flight computer not shown in the drawings, for positioning the first rotational part which includes tube 15 in its required azimuthal angular position, is supplied to terminal 51 and fed to first inputs of the first and second servo amplifiers 54 and 55, respectively.

The position signal from potentiometer 25, on line 52, is fed to the second input of servo amplifier 54. The position signal from potentiometer 26, on line 53, is similarly fed to the second input of servo amplifier 55. The output of each servo amplifier is equal, in magnitude and sense, to the difference between the demand signal and the measured signal applied to the amplifier inputs.

Servo amplifier 54 controls the azimuth servo motor 18 by way of line 56. Servo amplifier 55 similarly controls the azimuth guard servo motor 32. Since both servo systems operate to minimise the rotational error between the demand signal and the measured rotational position of gear wheel 16 and gear wheel 23, and the parts driven thereby, respectively, both the gear wheels are driven to exactly the same angular position.

In summary, the view of objective lens 2 around the optical axis 33 is determined by the rotation of axis 34 along with prism 1 and the assembly of tube 15. The view is inclined, relatively to the plane 42, by inclination of the prism 1. The image produced by lens 2 is focussed by tilting and axially moving lens 3. The image produced by lens 4 is rotated about the axis 33 by prism 5 and finally focussed onto the television camera screen 41. The image on plane 42 is illuminated locally of prism 1 by an annular lamp 43 and the intensity of the image upon screen 41 is controlled by iris 35.

The application of the present invention in the optical system of FIG. 1, providing mechanical separation and separate drive of the tube 15 assembly and of the slip ring assembly 21 ensures that the position of axis part 34 in azimuth is not impaired in accuracy by reason of the friction between the slip ring assembly 21 and the brush assembly 22.

We claim:

1. A device comprising a stationary part and a first rotatable part connected by electrical connecting members comprising slip rings and associated brushes, one of said electrical connecting members being mounted on a second rotatable part coaxial with the said first rotatable part, said first and second rotatable parts being interconnected by flexible electrical connections permitting limited rotational displacement therebetween, the first and second rotatable parts being separately rotated by first and second servo motor means, said first and second servo motor means respectively including first and second servo motors and both said servo motors being driven by a common angular demand signal, the first and second rotatable parts driving first and second angular position measuring devices, respectively, the first and second servo motors being driven to minimize the rotational error between the common angular demand signal and the measured angular position of the first and second rotatable parts, respectively.

2. A device as claimed in claim 1, having stationary brushes and having the slip rings assembled into a unitary structure so that all the slip rings are mounted together and rotated together with the second rotatable part.

3. A device as claimed in claim 1 in which the servo motor means for minimizing the rotational error between the common angular demand signal and the measured angular position of the first and second rotatable parts comprise, respectively, first and second servo amplifiers controlling the first and second servo motors, respectively, and fed both with the common angular demand signal and each with an angular position signal derived from the first and second angular position measuring devices, respectively.

4. An optical system having a lens defining an optical axis and an optical element which is driven in azimuth around the optical axis, including a device as claimed in claim 1, wherein the said optical element is mounted on the first rotatable part, the first and second rotatable parts and the slip rings are all coaxial with the optical axis and the first servo motor is an azimuth position servo motor.

5. An optical system as claimed in claim 4 including an adjustable iris arranged on the optical axis and driven by a third servo motor mounted on the first rotatable part, and supplied by way of the slip rings and associated brushes.

6. An optical system as claimed in claim 4, in which the optical element is a pitch prism driven in azimuth according to the first rotatable part and driven in pitch by a fourth servo motor mounted on the first rotatable part and supplied by way of the slip rings and associated brushes.

* * * * *